US006938869B2

(12) United States Patent
Lin et al.

(10) Patent No.: US 6,938,869 B2
(45) Date of Patent: Sep. 6, 2005

(54) PLASTIC PEDESTAL WITH A HEIGHT ADJUSTMENT FUNCTION

(75) Inventors: Chih-Chiang Lin, Taoyuan (TW); Shih-Chun Huang, Taipei (TW)

(73) Assignee: Quanta Computer Inc., Taoyuan Shien (TW)

( * ) Notice: Subject to any disclaimer, the term of this patent is extended or adjusted under 35 U.S.C. 154(b) by 0 days.

(21) Appl. No.: 10/872,364

(22) Filed: Jun. 22, 2004

(65) Prior Publication Data

US 2005/0109894 A1 May 26, 2005

(30) Foreign Application Priority Data

Oct. 30, 2003 (TW) ........................................ 92130339 A

(51) Int. Cl.[7] .............................................. F16M 11/28
(52) U.S. Cl. ........................ 248/414; 248/161; 248/919; 403/109.3
(58) Field of Search ............................ 248/295.11, 161, 248/162.1, 414, 917, 919, 920; 403/109.5, 109.1, 109.2, 109.3

(56) References Cited

U.S. PATENT DOCUMENTS

| 4,029,279 | A | * | 6/1977 | Nakatani ................... 248/188.5 |
| 4,174,900 | A | * | 11/1979 | Ina ........................... 248/163.1 |
| 6,282,084 | B1 | * | 8/2001 | Goerdt et al. ................ 361/683 |
| 6,712,321 | B1 | * | 3/2004 | Su et al. ................. 248/123.11 |
| 6,783,105 | B2 | * | 8/2004 | Oddsen, Jr. ............... 248/279.1 |
| 2004/0056161 | A1 | * | 3/2004 | Ishizaki et al. ........... 248/176.3 |
| 2004/0084579 | A1 | * | 5/2004 | Lee et al. ................. 248/125.1 |
| 2004/0113031 | A1 | * | 6/2004 | Sung ........................... 248/146 |

* cited by examiner

*Primary Examiner*—Jonathon Szumny
(74) *Attorney, Agent, or Firm*—Rabin & Berdo, PC

(57) ABSTRACT

A plastic pedestal with a height adjustment function is employed to support an LCD monitor. The plastic pedestal has a rail module, a plastic upper housing and a plastic lower housing. The rail module has a leaf spring, an inner rail and an inner block. The plastic upper housing docks with the rail module while the plastic lower housing docks with the plastic upper housing. Thus, the plastic upper housing is sandwiched between the rail module and the plastic lower housing so as to provide enough rigidity for the LCD monitor.

9 Claims, 4 Drawing Sheets

PLASTIC PEDESTAL WITH A HEIGHT ADJUSTMENT FUNCTION

BACKGROUND

1. Field of Invention

The present invention relates to a plastic pedestal with a height adjustment function. More particularly, the present invention relates to a plastic pedestal for supporting an LCD monitor.

2. Description of Related Art

In order to meet various customer demands for information electronics, more products are specialized for specific demands. For instance, an LCD monitor can be installed on a wall by means of a base, which attaches to the wall firmly; or some LCD monitors are placed on a desk by means of a normal base, which supports the LCD monitor. Moreover, the height of an LCD monitor pedestal must be adjustable to meet the various needs of desks, persons or chairs of different heights.

A conventional LCD monitor has a pedestal with a height adjustment function. This function is usually conducted by means of a spring, and assembling the spring is quite complicated. Besides, the pedestal is made of metal. It is very heavy and costly to produce a metal pedestal with a height adjustment function.

SUMMARY

It is therefore an objective of the present invention to provide a plastic pedestal with enough rigidity for the LCD monitor.

In accordance with the foregoing and other objectives of the present invention, a plastic pedestal with a height adjustment function is employed to support an LCD monitor. The plastic pedestal consists of a rail module, a plastic upper housing and a plastic lower housing. The rail module includes a leaf spring, an inner rail and an inner block. The plastic upper housing docks with the rail module while the plastic lower housing is employed docks with the plastic upper housing. Thus, the plastic upper housing is sandwiched between the rail module and the plastic lower housing so as to provide enough rigidity for the LCD monitor.

In general, the improved pedestal uses plastic materials instead of metal materials so as to reduce the weight of the pedestal. The plastic pedestal with a height adjustment function provides both a lightweight and decorative outer housing.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings, FIGS. 1A and 1B respectively illustrate perspective views of a rail module and a plastic upper housing before and after assembly according to one preferred embodiment of this invention.

DESCRIPTION OF THE PREFERRED EMBODIMENTS

Figure 1A:
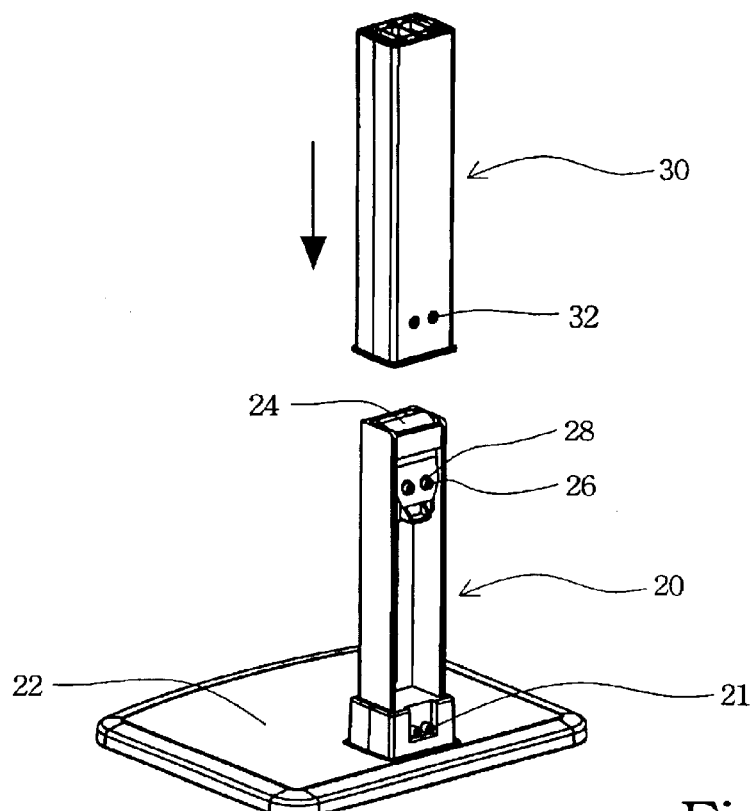

Reference will now be made in detail to the present preferred embodiments of the invention, examples of which are illustrated in the accompanying drawings. Wherever possible, the same reference numbers are used in the drawings and the description to refer to the same or like parts.

In order to solve the problem that the conventional LCD monitor's pedestal is huge and quite heavy, the present invention provides an improved plastic pedestal to support the LCD monitor. A conventional pedestal consists of a metal structure and a decorative outer plastic housing. The pedestal of the present invention uses plastic materials instead of metal materials. Thus, a plastic pedestal not only enjoys reduced weight but also has a small-size decorative outer housing.

The main reason a plastic pedestal has been unable to support an LCD monitor in the past is that the plastic pedestal does not support the LCD monitor as reliably as a metal pedestal. The present invention strengthens the plastic structure by redesigning the same.

Figure 1B:
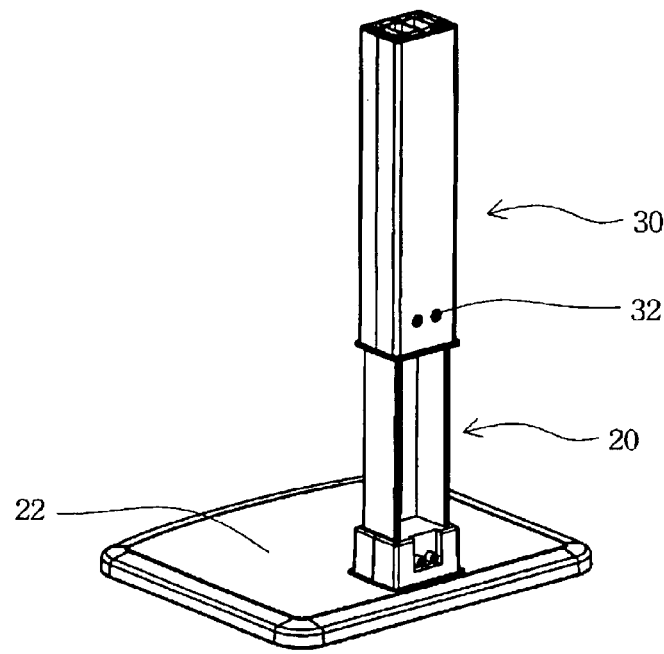

FIGS. 1A and 1B respectively illustrate perspective views of a rail module and a plastic upper housing before and after assembly according to one preferred embodiment of this invention. In FIG. 1A, the combination of the rail module 20 and the plastic upper housing 30 provides a height adjustment function. The size of the plastic upper housing 30 is larger than the rail module 20. The rail module 20 is secured on a base 22. The rail module 20 includes a leaf spring 24, an inner block 25 (illustrated in FIG. 3) and an inner rail 23. The inner rail 23 is a hollow parallel pipe having three major walls. One end of the inner rail 20 has a chamber 27 for storing the leaf spring 24, wherein the chamber 27 has a gap for installing the leaf spring 24 therein. One end with assembly holes 28 of the leaf spring 24 is lead through the gap. The inner block 25 has assembly pins 26 (illustrated in FIG. 3) to fit into assembly holes 28. In FIG. 1B, when the plastic upper housing 30 docks with the rail module 20, the plastic upper housing 30 connects with the assembly pins 26 of the inner block 25 by means of screws and screw holes 32. Thus, the plastic upper housing 30 and the inner block 25 move upward and downward simultaneously while adjusting the LCD monitor's height. Because the pulling force of the leaf spring 24 balances the friction force between the inner block 25 and the inner rail 20, the plastic upper housing 30 can reliably support the LCD monitor in both the upward and downward directions.

Figure 2A:
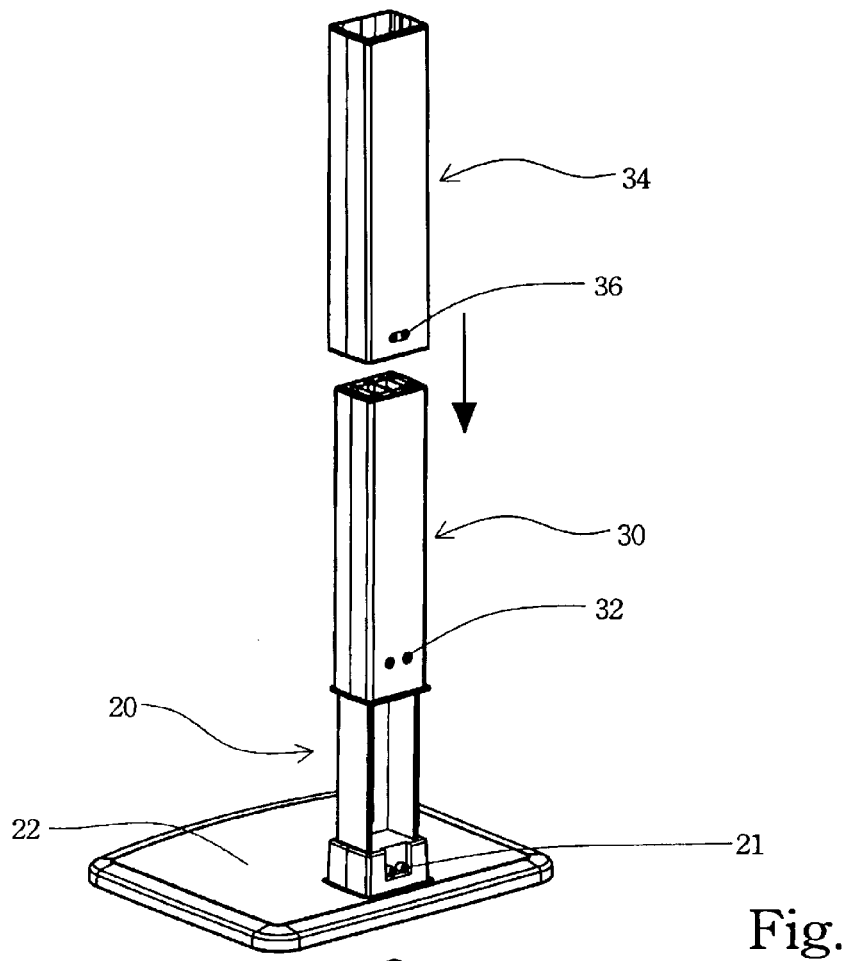
FIGS. 2A and 2B respectively illustrate perspective views of a plastic pedestal with a height adjustment function before and after assembly according to one preferred embodiment of this invention.
Figure 2B:
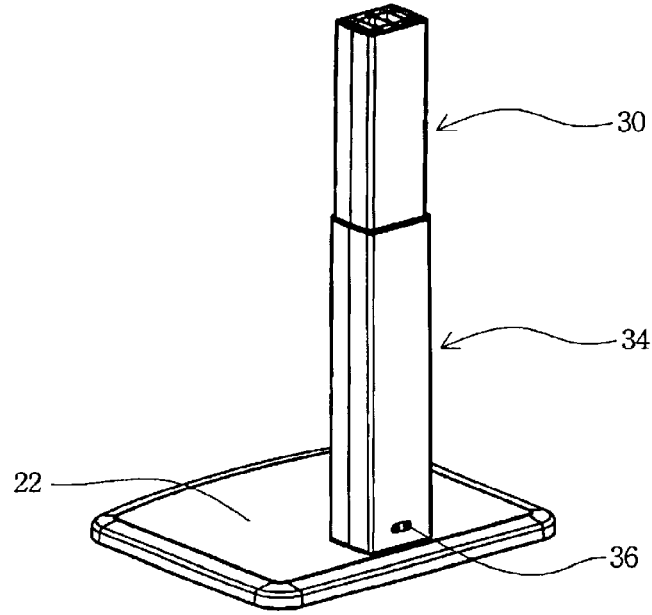

FIGS. 2A and 2B respectively illustrate perspective views of a plastic pedestal with a height adjustment function before and after assembly according to one preferred embodiment of this invention. In FIG. 2A, a plastic lower housing 34 is to dock with the plastic upper housing 30. In FIG. 2B, a plastic lower housing 34 is docked with a plastic upper housing 30. The size of the plastic lower housing 34 is larger than the plastic upper housing 30. The plastic lower housing 34 is connected with the inner rail 20 by means of screw holes 21 and screws.

Figure 3:
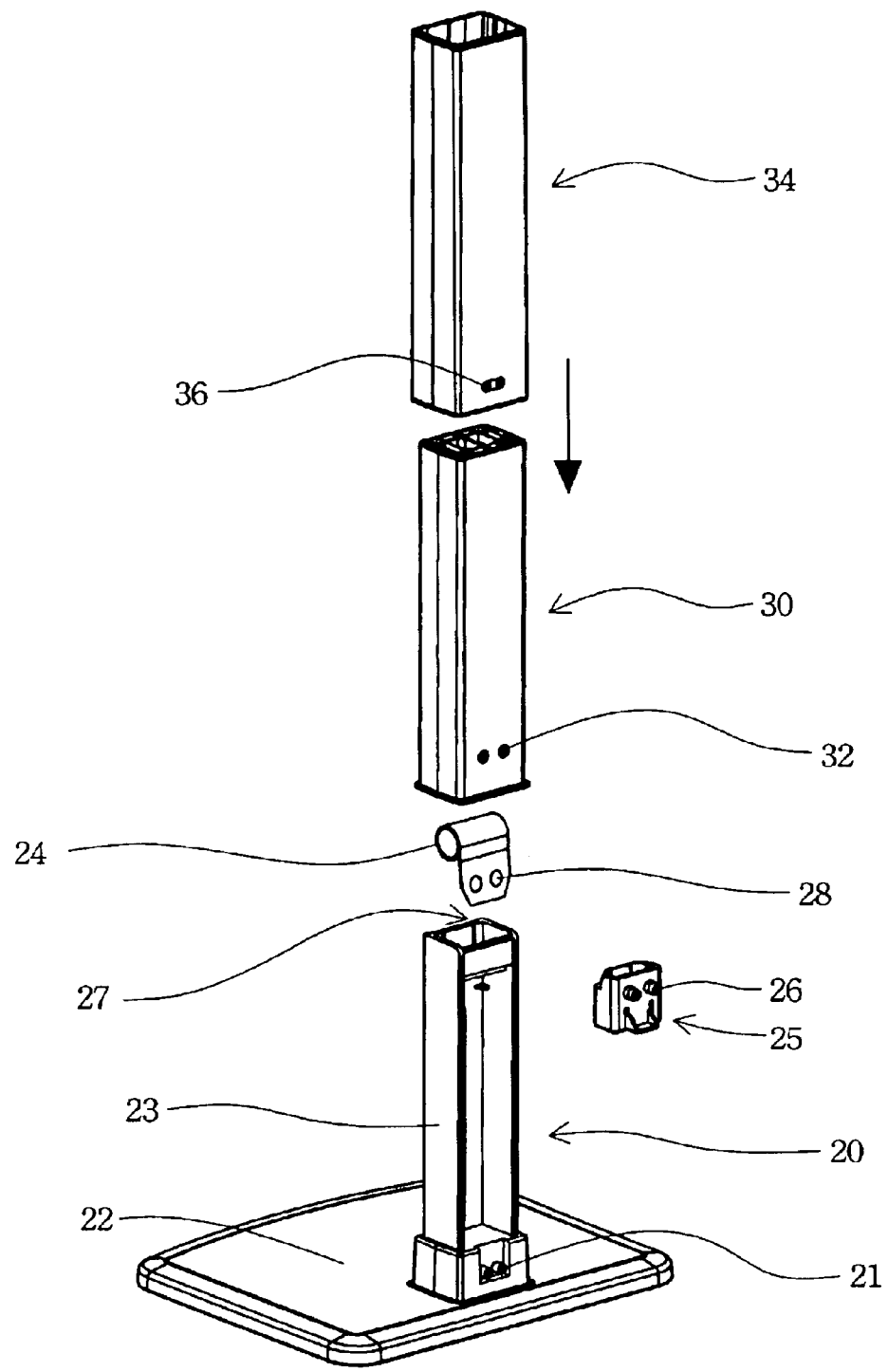
FIG. 3 illustrates an exploded view of a plastic pedestal with a height adjustment function before and after assembly according to one preferred embodiment of this invention.

FIG. 3 illustrates an exploded view of a plastic pedestal with a height adjustment function before assembly according to one preferred embodiment of this invention. A plastic pedestal includes a rail module 20, a plastic upper housing 30 and a plastic lower housing 34. The rail module 20 includes an inner rail 23, an inner block 25, and a leaf spring 24. The leaf spring 24 is installed in a chamber 27 of the rail module 20 during assembly. One end (with assembly holes 28) of the leaf spring 24 is lead through a gap of the chamber 27. The assembly pins 26 of the inner block 25 fit into the assembly holes 28 of the leaf spring 24. The plastic upper housing 30 moves downward and docks with the inner block 25 by means of screws 32. The plastic lower housing 34 moves downward and docks with the plastic upper housing 30. The plastic lower housing 34 is secured with the rail module 20 by means of screws (through screw holes 36 and screw holes 21). There are three contact surfaces between the plastic upper housing 30 and the inner rail 23, and four contact surfaces between the plastic upper housing 30 and the plastic lower housing 34. Thus, the plastic pedestal structure of present invention can provide reliable support for an LCD monitor. All components of the pedestal structure are made from plastic materials except the leaf spring 24.

Figure 4:
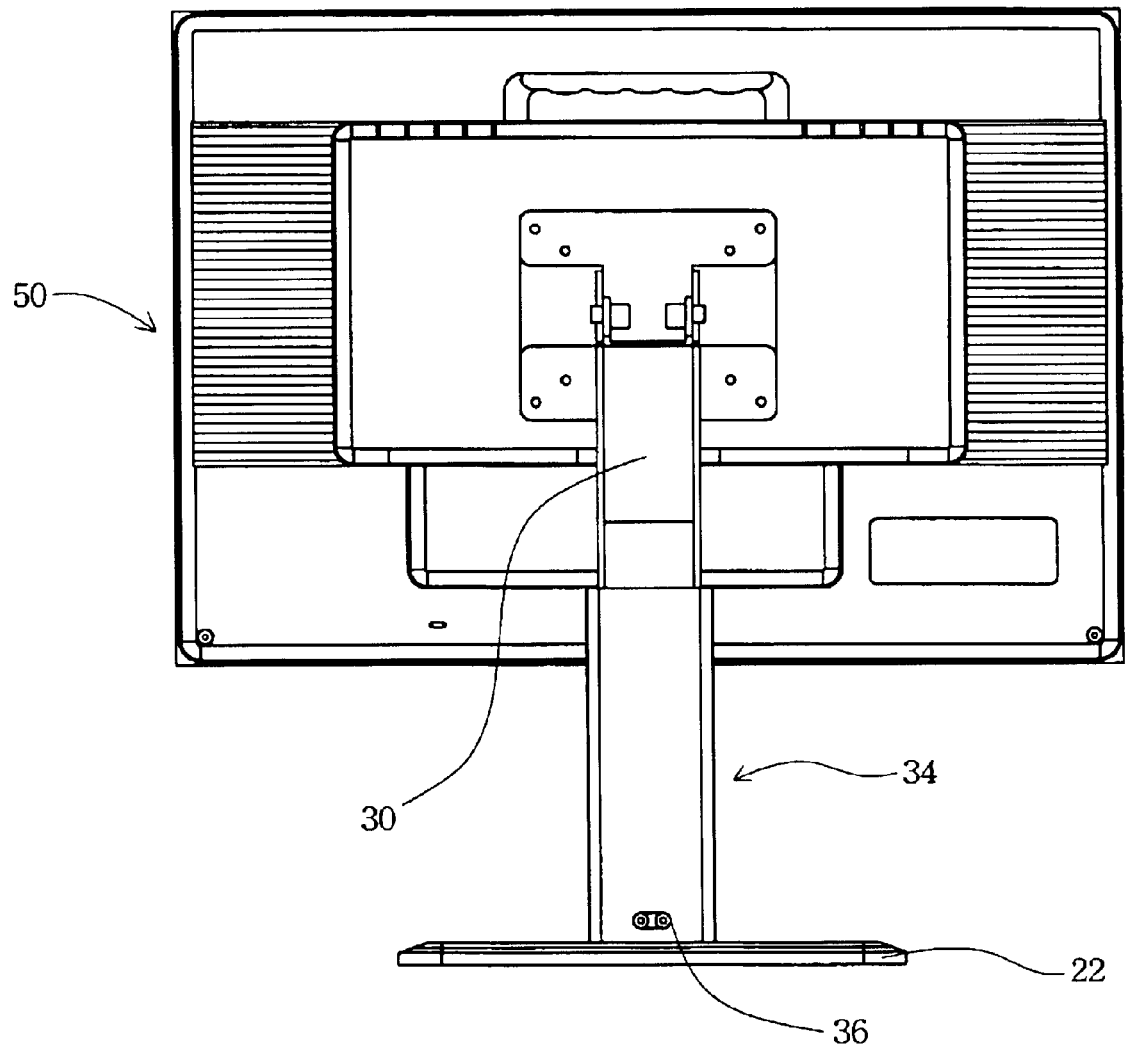
FIG. 4 illustrates a perspective view of LCD monitor utilizing a plastic pedestal according to one preferred embodiment of this invention.

FIG. 4 illustrates a perspective view of LCD monitor utilizing a plastic pedestal according to one preferred embodiment of this invention. An LCD monitor 50 is secured to the plastic upper housing 30 by means of screws. The plastic upper housing 30 is supported by the plastic lower housing 34, the rail module 20 and the base 22.

According to the preferred embodiment of present invention, the improved pedestal uses plastic materials instead of metal materials so as to reduce the weight thereof. The plastic pedestal with a height adjustment function provides a both lightweight and decorative outer housing.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A plastic pedestal with a height adjustment function employed to support an LCD monitor, comprising:
   a plastic rail module, that includes a leaf spring mounted to an inner block comprising an assembly pin, and an inner rail that is a hollow parallel pipe having three major walls;
   a plastic upper housing, docking with said plastic rail module; and
   a plastic lower housing, docking with said plastic upper housing, wherein said plastic upper housing moves upward and downward while sandwiched between said inner rail and said plastic lower housing to provide the LCD monitor with a height adjustment function,
   wherein said plastic upper housing is connected with said assembly pin by means of screws.

2. The plastic pedestal of claim 1, wherein said leaf spring is shaped into a coil, and one end of said leaf spring includes an assembly hole.

3. The plastic pedestal of claim 2, wherein said assembly pin of said inner block fits into said assembly hole.

4. A pedestal with a height adjustment function employed to support an LCD monitor, said pedestal comprising:
   a leaf spring, wherein one end of the leaf spring includes an assembly hole;
   an inner rail, including a hollow parallel pipe including three major walls, one end of said inner rail having a chamber for receiving said leaf spring;
   an inner block, having an assembly pin fitting into said assembly hole;
   a plastic upper housing, docking with said inner rail and connecting to said inner block; and
   a plastic lower housing, docking with said inner rail, wherein said plastic upper housing moves upward and downward while sandwiched between said plastic rail module and said plastic lower housing to provide the LCD monitor with a height adjustment function.

5. The pedestal of claim 4, wherein said leaf spring is shaped into a coil.

6. The pedestal of claim 4, wherein said plastic upper housing is connected with said assembly pin by means of screws.

7. The pedestal of claim 4, further comprising a base connecting with said inner rail.

8. The pedestal of claim 4, wherein said plastic lower housing is connected with said inner rail by means of screws.

9. A pedestal with a height adjustment function employed to support an LCD monitor, said pedestal comprising:
   a leaf spring, wherein one end of the leaf spring includes an assembly hole;
   an inner rail, including a hollow parallel pipe including three major walls, one end of said inner rail having a chamber for installing said leaf spring;
   an inner block, having an assembly pin fitting into said assembly hole;
   an upper housing, docking with said inner rail module and connecting said inner block; and
   a lower housing, docking with said inner rail, wherein said plastic upper housing moves upward and downward while sandwiched between said plastic rail module and said plastic lower housing to provide the LCD monitor with a height adjustment function.

* * * * *